United States Patent
Goldwasser et al.

(10) Patent No.: US 10,885,158 B2
(45) Date of Patent: Jan. 5, 2021

(54) DEVICE, SYSTEM AND METHOD FOR TOKEN BASED OUTSOURCING OF COMPUTER PROGRAMS

(71) Applicant: Duality Technologies, Inc., Maplewood, NJ (US)

(72) Inventors: Shafi Goldwasser, Cambridge, MA (US); Vinod Vaikuntanathan, Boston, MA (US)

(73) Assignee: DUALITY TECHNOLOGIES, INC., Maplewood, NJ (US)

( * ) Notice: Subject to any disclaimer, the term of this patent is extended or adjusted under 35 U.S.C. 154(b) by 95 days.

(21) Appl. No.: 15/996,862

(22) Filed: Jun. 4, 2018

(65) Prior Publication Data

US 2018/0349577 A1 Dec. 6, 2018

Related U.S. Application Data

(60) Provisional application No. 62/515,153, filed on Jun. 5, 2017.

(51) Int. Cl.
| | |
|---|---|
| *G06F 21/14* | (2013.01) |
| *H04L 9/14* | (2006.01) |
| *H04L 29/06* | (2006.01) |
| *H04L 9/30* | (2006.01) |
| *H04L 9/08* | (2006.01) |

(52) U.S. Cl.
CPC ............ *G06F 21/14* (2013.01); *H04L 9/0894* (2013.01); *H04L 9/14* (2013.01); *H04L 9/3073* (2013.01); *H04L 63/0478* (2013.01); *H04L 2209/16* (2013.01); *H04L 2209/46* (2013.01)

(58) Field of Classification Search
CPC . G06F 21/14; G06F 21/75; G06F 9/46; G06F 12/1408; H04L 2209/46; H04L 63/0478; H04L 9/14; H04L 2209/16; H04L 9/0894; H04L 9/3073

See application file for complete search history.

(56) References Cited

U.S. PATENT DOCUMENTS

2017/0242961 A1* 8/2017 Shukla ................ G06F 21/53
2018/0011996 A1* 1/2018 Dolev ................... H04L 9/085

* cited by examiner

*Primary Examiner* — Olugbenga O Idowu
(74) *Attorney, Agent, or Firm* — Pearl Cohen Zedek Latzer Baratz LLP

(57) ABSTRACT

A multi-party system, devices, and method for token-based obfuscation of secret information. A first party device may store a secret original program T and original data D, retrieve a set of secret keys SK, obfuscate the original program T with the set of secret keys SK to generate an obfuscated program T', obfuscate the original data D with the set of secret keys SK to generate a token of the data Token(D), and transfer the obfuscated program T' and Token (D) to a second party device. The second party device may evaluate the obfuscated program T' on the token of the data Token(D) to generate a result equivalent to evaluating the original program T on the original data D if the same set of secret keys SK is used to obfuscate the original program T and the original data D, without exposing the original program T to the second party.

21 Claims, 3 Drawing Sheets

DEVICE, SYSTEM AND METHOD FOR TOKEN BASED OUTSOURCING OF COMPUTER PROGRAMS

CROSS-REFERENCE TO RELATED APPLICATIONS

This Application claims the benefit of U.S. Provisional Application No. 62/515,153, filed Jun. 5, 2017, which is hereby incorporated by reference in its entirety.

FIELD OF THE INVENTION

Embodiments of the invention relate to the field of data privacy, security, encryption, and code obfuscation.

Embodiments of the invention include systems and methods to encode programs and data and outsource them to an external or third party computation host, which can then execute the programs only on secure encoded data.

BACKGROUND OF THE INVENTION

Fully Homomorphic Encryption (FHE) cryptosystems allow a third party to evaluate any computation on encrypted data without learning anything about it, such that only the legitimate recipient of the homomorphic calculation will be able to decrypt it using the recipient's secret key.

Functional Encryption (FE) cryptosystems allow authorized third parties who cannot decrypt, to evaluate selective authorized computations on encrypted data without decrypting first. Such authorized third parties receive a different secret key for each computation, which enables the calculation of the computation on the data without decryption. In secret-key functional encryption schemes, both decryption and encryption require knowing a secret-key. In public-key functional encryption, decryption requires knowing a secret key, whereas encrypting can be done without knowing a secret-key and does not compromise security.

SUMMARY OF EMBODIMENTS OF THE INVENTION

In many cases, hosting programs in the cloud or on any third party computation host, may raise security and privacy concerns for both the data provider and the program provider. Embodiments of the invention may hide or obfuscate the details of the program to be computed, which may be referred to as "code obfuscation" or "code garbling." Such a framework allows the execution of programs by a third party on authorized data, without exposing the details of the programs (e.g., calculations or computations) or the data (original input, intermediate information, or final results), and can keep information secret as well as ensure data privacy while utilizing cloud or third party computing power.

Embodiments of the invention may include token-based schemes for outsourcing secret programs (e.g., calculations or computations) and/or secret data (e.g., input to the program) in a secure and private manner. The secret program may be encoded to be executed on the data (if and only if) a suitable digital token for the data is provided. A token may be data-specific encoding of the original data, e.g., a secret-key functional encryption (SFE) of the data D, configured to grant a third party access to perform programs on specific data, without accessing the secret program itself. Conversely, the token may be a program-specific encoding of the original program configured to grant a third party access to perform the program on any data, without accessing the original data itself.

Some embodiments of the invention provide a multi-party system, devices, and method for token-based obfuscation of secret information. A first party device may be configured to store a secret original program T and original data D, retrieve a set of secret keys SK, obfuscate the original program T with the set of secret keys SK to generate an obfuscated program T', obfuscate the original data D with the set of secret keys SK to generate a token of the data Token(D). The first device may be configured to transfer, and a second party device may be configured to receive, the obfuscated program T' and the token of the data Token(D). The second party device may be configured to evaluate the obfuscated program T' on the token of the data Token(D) to generate a result equivalent to evaluating the original program T on the original data D if the same set of secret keys SK is used to obfuscate the original program T and the original data D, without exposing the original program T to the second party.

In some embodiments, the first device is the original program T provider, the second party device is the original data provider, and an additional third party device may perform the evaluation T(D) without exposing the original program T or the original data D to the third party device.

Additionally or alternatively, the first party device may distribute the obfuscation of the program T' (or of sub-portions of the program) and the token of the data Token(D) (or of sub-portions of the data) to a plurality of (respective) second party devices to share the computational load of said evaluation and decrease processing time, without exposing the original program T to the plurality of second party devices.

Some embodiments of the invention may be used to obtain statistics from a database containing sensitive information. In this case, the computation may be considered as providing query-access to the private database and the query as providing the input to the computation.

For programs comprising linear computations, some embodiments of the invention provide an efficient token-based scheme, wherein a user (or an agent acting on behalf of a user) encrypts data and stores it on a server, and the user can later issue tokens for linear functions that allow the server to compute these functions on the encrypted data and obtain the result of the linear functions on the data. The new token generation algorithm run-time may be logarithmic in the number of summands of the linear function to execute a fast and efficient distributed program.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
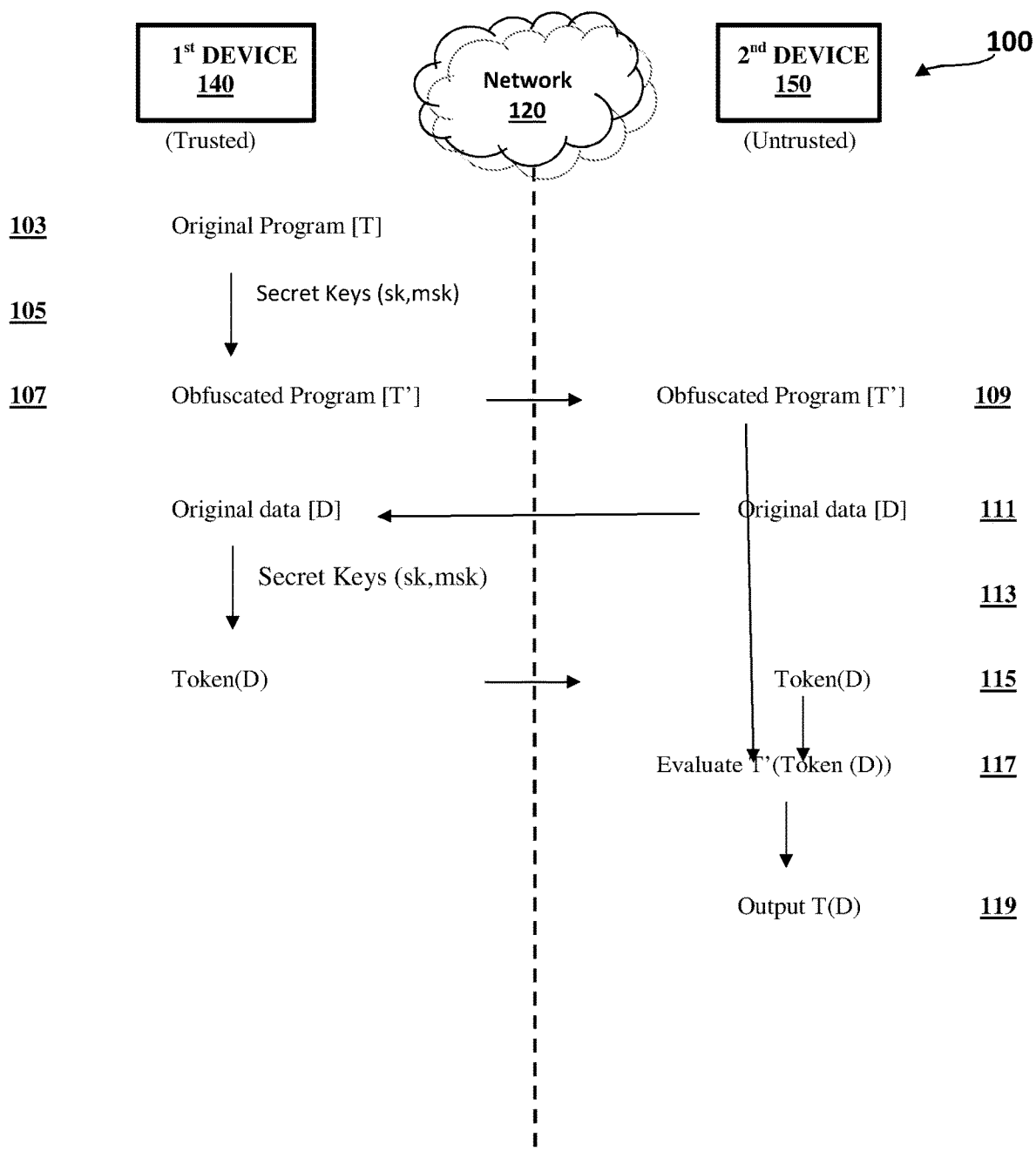
FIG. 1 is a schematic illustration of a workflow for token-based obfuscation of secret information in a multi-party system, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

A system, device, and method is provided for token-based models for outsourcing encrypted (or garbled) programs on encrypted (or non-encrypted) data. A particular scheme is provided for fast and efficient execution of programs with linear computations. Such system and method may maintain security for outsourcing private programs and/or data to untrusted computation hosts. The program provider may distribute digital tokens for the data to the hosts that enable the hosts to execute the outsourced programs on the data, without exposing the secret programs (and in some embodiments, secret data) to the hosts.

Token Based Obfuscation Model

Reference is made to FIG. 1, which schematically illustrates a workflow for token-based obfuscation of secret information in a system 100, in accordance with some embodiments of the invention. System 100 is a multi-party system comprising one or more first party device 140, one or more second party device(s) 150, and any number of N additional device(s), connected by a network 120 to transfer information therebetween. First party device 140 may store and obtain or originate a secret program T. For security reasons, first party device 140 may be unable to share the secret program T with other devices or parties in the system 100. However, first party device 140 may seek to distribute the computational load of executing the program. To balance the opposing needs of security (keeping T private) and computational efficiency (sharing the computational effort of executing T), embodiments of the invention provide a token-based obfuscation system 100. In this system, first party device 140 shares with second party device 150 an obfuscated version of the program T' (that is unencryptable by second party 150) and a token that is an obfuscated version of the original data Token(D). First party device 140 obfuscates T and D with the same set of secret keys SK, such that, when the obfuscated program T' is executed on the data token Token(D), the result is equivalent to running the original program T on the original data D, without ever exposing the original program T. First party device 140 may issue data tokens Token(D) for second party device 150, third party device, or any number of N devices in system 100 to execute obfuscated program T' and return the same result as if it executed the original program T (without ever accessing T). In this way, first party device 140 may distribute the computational load of evaluating the program, without exposing the original program T (and/or the original data D) to the second party device 150.

In operation 103, first party device 140 retrieves, obtains, or generates, a secret original program T. Original program T may be exposed only to first party device 140, but not second party device 150. Original program T may be stored at first party device 140 in an unencrypted form, or in an encrypted form, where first party device 140 possesses the corresponding secret decryption key. In one embodiment, first party device 140 may be the sole system device or party to store the unencrypted version of the secret program T or its decryption key.

In operation 105, first party device 140 retrieves, obtains, or generates a set of one or more secret keys SK. The set of secret keys SK may include a secret-key sk for a standard encryption, and a master secret-key msk for a functional encryption of the secret program T. First party device 140 may be the sole system device or party to store, access, or possess the set of secret keys SK.

In operation 107, first party device 140 may obfuscate the original program T with the set of secret keys SK to generate an obfuscated program T'. The obfuscated program T' may be a program that inputs data d and executes computer code (G=(sk,D)) that is configured to decrypt a standard encryption of the original program (C=(sk,T)) using the secret-key sk to reconstruct the original program T and output the result of evaluating the original program on the input data T(d). The obfuscated program T' may return the desired computation T(D) if and only if the input data d is equal to the token of the original data Token(D).

In operation 109, first party device 140 may transfer the obfuscated program T' to second party device 150. Second party device 150 does not possess the set of secret keys SK, and so, cannot decrypt T' to expose the secret program T.

In operation 111, first party device 140 may obtain, store, or generate the original data D. Original data D may or may not be secret and may originate at first party device 140, second party device 150 (as shown in FIG. 1), or another system device.

In operation 113, first party device 140 may obfuscate the original data D with the set of secret keys SK to generate a token of the data Token(D). Token(D) may be a functional encryption of the data D encoded by the master secret key msk in SK. Token(D) may only be accurately acted on by obfuscated program T' encoded by the same set of secret keys SK. Tokens can thus be distributed to one or more second device(s) 150 across the system 100 to perform obfuscated programs on the specific data D.

In operation 115, first party device 140 may transfer the Token(D) to one or more second party device(s) 150. In embodiments where data D is a secret of first party device 140, second party device 150 does not possess the set of secret keys SK, and so cannot decrypt Token(D) to expose the original data D.

In operation 117, one or more second party device(s) 150 may evaluate the obfuscated program T' on the token of the data Token(D). The obfuscated program T' executes computer code (G=(sk,D)) that is configured to decrypt a standard encryption of the original program (C=(sk,T)) using the standard secret-key sk to reconstruct the original program T and output the result of evaluating the original program on the input data T(d). This result equals T(D) if and only if the input d=Token(D). If second device 150 attempts to execute other programs (non-obfuscated or obfuscated with different key(s) other than SK) with Token(D) or attempts to execute obfuscated program T' with other data (non-token data, or data tokens generated with different key(s) other than SK), an error will result. The evaluation computation(s) may be performed by one, or distributed among many, second party device(s) 150, to share the computational load of the evaluation, without exposing either the original program T (and possibly the original data D) to the second party device(s) 150.

In operation 119, if the same set of secret keys SK is used to obfuscate the original program T in operation 105 and the original data D in operation 113, evaluating T' on Token(D)

may generate a result equivalent to evaluating the original program T on the original data D, without exposing the original program T to the second party device(s) 150.

Other or different operations or orders of operations may be used. For example, the timing of processing program T (operations 103-109) may occur before (as shown), concurrent or simultaneous to, or after the timing of processing data D (operations 111-115). Further, some operations may be modified or skipped. For example, if the first device is the data D provider (instead of the second device), original data D may not be received from the second device in operation 111.

Embodiments of the invention result in a significant improvement in computer security and data privacy in a multi-party or multi-device system 100, e.g., where some of the parties 150 may be untrusted. When first party device 140 possesses secret program(s) or data, it may be unable to share the secret information with other second devices or parties 150. However, it may be impractical or slow for the first party device 140 to locally run all the programs over all the data itself, and may thus want to share some of the computational burden with other parties or devices 150. According to embodiments of the invention, there is now provided a mechanism to run a secret program (exposed only at first party device 140) at second party device 150 without exposing the secret program to second party device 150. This is accomplished by obfuscating the program and data, sharing only the obfuscated versions of the program and/or data, and executing the obfuscated version of the program on an obfuscated version of the data, such that the two obfuscations cancel, which yields the same result as executing the original program on the original data, without ever exposing the original program to the second party device 150.

Embodiments of the invention provide a model for enabling a computation host to perform secret computations without learning the details of the underlying data or the computations. In fact, the computation host may learn nothing about the data or about the computations, except the results of running the computations on the data.

The secret computation may be any computation for commercial, research or any other purpose. For convenience, embodiments of the invention may refer to the computations as a "test" and to the test owner as the "test provider", although any other computation and party may be used.

Embodiments of the invention provide a system and method for the test provider to transform an original (e.g. unprotected) test T into a so called obfuscated (e.g. garbled or encrypted) test T'. Because test T' is obfuscated, it can be stored in the computation host or another location (which may be potentially insecure), and may be available for anyone to see or duplicate. The obfuscated test T' does not reveal anything (or reveals minimal information) about the test T, although the result of running the original test T on data D is the same as the running the obfuscated test T' on an appropriate encoding of data D provided in the form of a digital token (as described below).

Obfuscated test T' typically cannot be used to compute original test T on data D, unless the test provider provides a digital token referred to as Token(D) which constitutes an encoding of data D which enables performing the obfuscated test T' and also provides an authorization for performing the obfuscated test T' on data D Given the obfuscated test T' and Token(D), the test result T(D) can be computed. Access to many tokens Token$(D_1)$, ..., Token$(D_k)$ each for different data items $D_1$, ..., $D_k$, may enable the test results $T(D_1)$, ..., $T(D_k)$ to be computed. However, it may not be possible to compute the original test T on any other data item D' different from $D_1$, ..., $D_k$.

A token-based method may be implemented in some embodiments of this invention by the following operations:
Tk.Setup: outputs a set of keys SK
Tk.obfuscate: inputs a set of keys SK and a description of an original test T and outputs an obfuscated version of the test, T'.
Tk.Token: inputs a set of keys SK and data D and outputs token Token(D).
Tk.Evaluate: inputs an obfuscated test T' and token Token(D) and outputs the result of the test T on the data D, namely T(D).

Other or different operations may be used to achieve the same or similar functionality.

In some embodiments, the results T(D) of Tk.Evaluate may be returned in an encrypted form that may be further decrypted.

Implementation Based on Secret-Key FE

Embodiments of the invention provide a system and method for implementing the token-based method using the following two cryptographic primitives.

1. A secret-key functional-encryption scheme for a class of functions F. A secret-key functional encryption SFE may be defined by a tuple of algorithms SFE=(SFE.Setup, SFE.KeyGen, SFE.Enc, SFE.Dec). SFE.Setup inputs the security parameter and outputs a master secret key msk. SFE.KeyGen inputs the master secret key msk and a description of a function f in F and outputs a key skf. SFE.Enc inputs the master secret key msk and an input D and outputs a ciphertext "c". SFE.Dec inputs a key sk and a ciphertext c and outputs a value "y" such that: y=D when both c=SFE.Enc(msk, D) and sk=msk; and y=f(D) when both c=SFE.Enc (msk,D) and sk=SFE.KeyGen(msk,f).

2. A secret-key encryption scheme E=(Gen, Enc, Dec) (such as the AES scheme). Gen inputs a security parameter and outputs a key sk; Enc inputs the key sk and a message m and outputs a ciphertext c; Dec inputs the key sk and a ciphertext c and outputs the message m.

In one embodiment, an implementation for the token-based scheme may proceed as follows using SFE= (SFE.Setup, SFE.KeyGen, SFE.Enc, SFE.Dec) and E=(Gen, Enc, Dec):

Tk. SetUp(security parameter k):
   Run SFE. Setup(security parameter k) to compute msk.
   Run Gen(security parameter k) to compute the key sk.
   Output SK=(msk, sk).
Tk.Obfuscate(SK,T) where test T is a description of a function in F and SK=(msk, sk):
   Let C=Enc(sk,T).
   Define a function G(sk,D) that gets two parameters sk and D, decrypts T=Dec(sk, C), and outputs T(D).
   Output T'=SFE. KeyGen(msk, G).
Tk.Token(SK,D) where SK=(msk, sk):
   Set x=(sk, D).
   Output Token(D)=SFE.Enc(msk,x).
Tk.Evaluate(T', Token(D)):
   Output SFE.Dec(T', Token(D)).

Other or different operations or orders of operations may be used to achieve the same or similar functionality.

Note that, in some embodiments, a party may encrypt multiple tests T and multiple pieces of data D with the same set of keys SK. The result of Tk.Evaluate(T',Token(D)) will equal T(D) whenever the same set of keys SK is used in the computation of test T' and the computation of Token(D), for example, when T'=Tk.Obfuscate(SK,T) and Token(D)=Tk.Token(SK,D).

In some embodiment the secret key SFE can be replaced by a public-key functional encryption (FE) comprising a tuple of algorithms FE.Setup, FE.KeyGen, FE.Enc, FE.Dec (e.g. replacing SFE.Setup, SFE.KeyGen, SFE.Enc, SFE.Dec respectively, in the above description).

In some embodiments the secret key SFE can be replaced by a bounded-key secret-key functional encryption (BK-SFE) comprising a tuple of algorithms BK-SFE.Setup, BK-SFE.KeyGen, BK-SFE.Enc, BK-SFE.Dec (e.g. replacing SFE.Setup, SFE.KeyGen, SFE.Enc, SFE.Dec, respectively, in the above description). In case BK-SFE is used, the number of keys generated by BK-SFE.KeyGen may be bounded by a predetermined number assigned as an additional input to the BK-SFE.Setup algorithm.

In some embodiments the secret key SFE can be replaced by a bounded-key public-key functional encryption (BK-FE) comprising a tuple of algorithms BK-FE.Setup, BK-FE.KeyGen, BK-FE.Enc, BK-FE.Dec (e.g. replacing SFE.Setup, SFE.KeyGen, SFE.Enc, SFE.Dec, respectively, in the above description). In case BK-FE is used, the number of keys generated by BK-FE.KeyGen may be bounded by a predetermined number assigned as an additional input to the BK-FE.Setup algorithm.

Switching Between the Data and the Program

In some embodiments, programs, computations or functions may be equivalent to data, and data may be defined as a function of functions. In one embodiment, given a test T and a data D, operating a test on the data resulting in an output T(D) may be equivalent to operating the data on the test resulting in the same output D(T). Since both data and computations are eventually encoded (e.g. as bits), they could both be encrypted, and the token-based model would work the same when switching the roles of the data and the test.

A dual token-based model would look, for example, as follow:

DTk.Setup inputs a security parameter and outputs a set of keys SK.

DTk.obfuscate inputs a set of keys SK and data D and outputs an encryption of the data D'.

DTk.Token inputs a set of keys SK and a test T and outputs a token Token(T).

DTk.Evaluate inputs encrypted data D' and a token Token (T) and outputs the value of the test T on the data D, namely T(D).

In such embodiments, the data provider may be the party interested in keeping its data a secret, and may want to control computations on its data by allowing only approved parties tokens to run specific tests on its data.

Efficient Token Based Model for Linear Weighted Sum

Embodiments of the invention provide a system and method for efficient token-based calculation of linear weighted sums on encrypted data.

First, the following public parameters of the system may be selected:

A number N which is a product of two large prime numbers p and q.

A generator g of the group $G := \mathbb{Z}^*_{N^2}$.

$h := N+1 \in G$

A party's secret key can be any secret allowing the party to generate secret numbers $y_i \in G$ for every index i (or a subset of indices i). For example, a party can use a nonce K and define $y_i$ to be a hash of K concatenated to the index i.

Given this secret key, a vector of integers $(x_1, \ldots, x_n)$ in G may be encrypted, for example, as follows. A random number $r \in 0,2N$ is chosen. Using r, compute $c_0 := g^r \in G$ and for every $i \in n$ compute $c_i := g^{r y_i} h^{x_i} \in G$. The encryption of the data may be the vector $c := (c_0, c_1, \ldots, c_n)$.

Given the secret key, a token t for the weights $(w_1, \ldots, w_n) \in G^n$ where $t := \Sigma_{i=1}^n w_i x_i \in G$ may be calculated. The knowledge of t allows the linear weighted sum $\Sigma_{i=1}^n w_i x_i$ for encrypted data $(x_1, \ldots, x_n))$ to be calculated. Any party having an encryption c and a token t encrypted under the same key can calculate $\Sigma_{i=1}^n w_i x_i$, for example, as:

$$c_0^{-t} \prod_{i=1}^n c_i^{w_i} = g^{-rt} \prod_{i=1}^n g^{r w_i y_i} h^{w_i x_i} = g^{-r \Sigma_{i=1}^n w_i y_i} \cdot g^{\Sigma_{i=1}^n r w_i y_i} h^{\Sigma_{i=1}^n w_i x_i} =$$

$$h^{\Sigma_{i=1}^n w_i x_i} = (N+1)^{\Sigma_{i=1}^n w_i x_i} = 1 + N \cdot \sum_{i=1}^n w_i x_i \in G$$

(as $N^2 = 0$ in G), from which $\Sigma_{i=1}^n w_i x_i$ can be extracted.

Here as well, the data $(x_1, \ldots, x_n)$ may be decrypted and tokens may be issued for weights $(w_1, \ldots, w_n)$, or, equivalently, the weights $(w_1, \ldots, w_n)$ may be encrypted and tokens may be issued for data $(x_1, \ldots, x_n)$. For example, a data provider can encrypt his data and issue tokens for researchers, or a test provider can encrypt a test and issue tokens for using the test on specific data.

Learning with Errors (LWE)-Based Token Based obfuscation for Linear Functions

Embodiments of the invention provide another system and method for efficient token-based calculation of linear weighted sums on encrypted data.

First, the following public parameters of the system may be selected:

A positive integer q, usually chosen to be a prime number.

A number n which is the security parameter of the system.

An error distribution $\chi$ which is a discrete Gaussian distribution with standard deviation σ. In typical instantiations, σ may be chosen to be sufficiently smaller than q for correctness of decryption.

A party's secret key can be any secret allowing the party to generate secret vectors $s_i \in Z_q^n$ for every index i (or a subset of indices i). For example, as above, a party can use a nonce K and define $s_i$ be a hash of K concatenated to the index i. Given this secret key, a vector of integers $(x_1, \ldots, x_k)$ in $Z_p^k$ (for some integer p relatively prime to q) may be encrypted, for example, as follows.

A random vector $a \in Z_q^n$ may be selected together with error values (numbers) $e_i \in Z_q$ chosen from the discrete Gaussian distribution with standard deviation a. Using these error values, one can compute $c_0 := a \in Z_q^n$ and for every $i \in n$ compute $c_i := \langle a, s_i \rangle + p e_i + x_i \in Z_q$. The encryption of the data may be the vector $c := (c_0, c_1, \ldots, c_n)$.

Given the secret key, to issue a token for the weights $(w_1, \ldots, w_k) \in Z_p^k$ (e.g. allowing one to calculate the linear weighted sum $\Sigma_{i=1}^k w_i x_i$ for encrypted data $(x_1, \ldots, x_k)$), token $\Sigma_{i=1}^k w_i x_i s_i \in Z_q^n$ may be given. Any party having an encryption c and a token t encrypted under the same key can calculate $\Sigma_{i=1}^k w_i x_i$, for example, as:

$$\sum_{i=1}^k w_i c_i - \langle a, t \rangle = \sum_{i=1}^k w_i \cdot \langle a, s_i \rangle + p \cdot \sum_{i=1}^k w_i \cdot e_i + \sum_{i=1}^k w_i x_i - \left\langle a, \sum_{i=1}^k w_i s_i \right\rangle =$$

$$p \cdot \sum_{i=1}^{k} w_i \cdot e_i + \sum_{i=1}^{k} w_i x_i$$

from which $\sum_{i=1}^{k} w_i x_i$ can be determined by computing the mod p operation. In other embodiments of the invention, the weights $w_i$ may be selected from $Z_q$ or other domains.

Here as well, the data $(x_1, \ldots, x_k)$ may be decrypted and the tokens may be issued for weights $(w_1, \ldots, w_k)$, or, equivalently, the weights $(w_1, \ldots, w_k)$ may be encrypted and tokens may be issued for data $(x_1, \ldots, x_k)$. For example, a data provider can encrypt his data and issue tokens for researchers, or a test provider can encrypt a test and issue tokens for using it on specific data.

In summary, a system, device, and method are provided for a token based obfuscation model where computations are obfuscated and data is transformed to a digital token which provides an encoding of the data and authorization for performing the computations on the data. The system can be implemented by a functional encryption scheme where the functional keys correspond to the obfuscated computations and the ciphertext (e.g. encryption) of a data corresponds to digital token for that data. Alternatively the functional keys correspond to the digital token for the data and the ciphertext correspond to obfuscated computations.

Embodiments of the invention may employ one master key to generate many functional keys for many tests and to generate tokens for many data items on which specific tests will be run, or may employ one master key per test and data pair. Embodiments of the invention may employ a variety of underlying functional key schemes including secret-key functional encryption schemes or bounded-key functional encryption schemes using public or secret keys.

System Components

Figure 2:
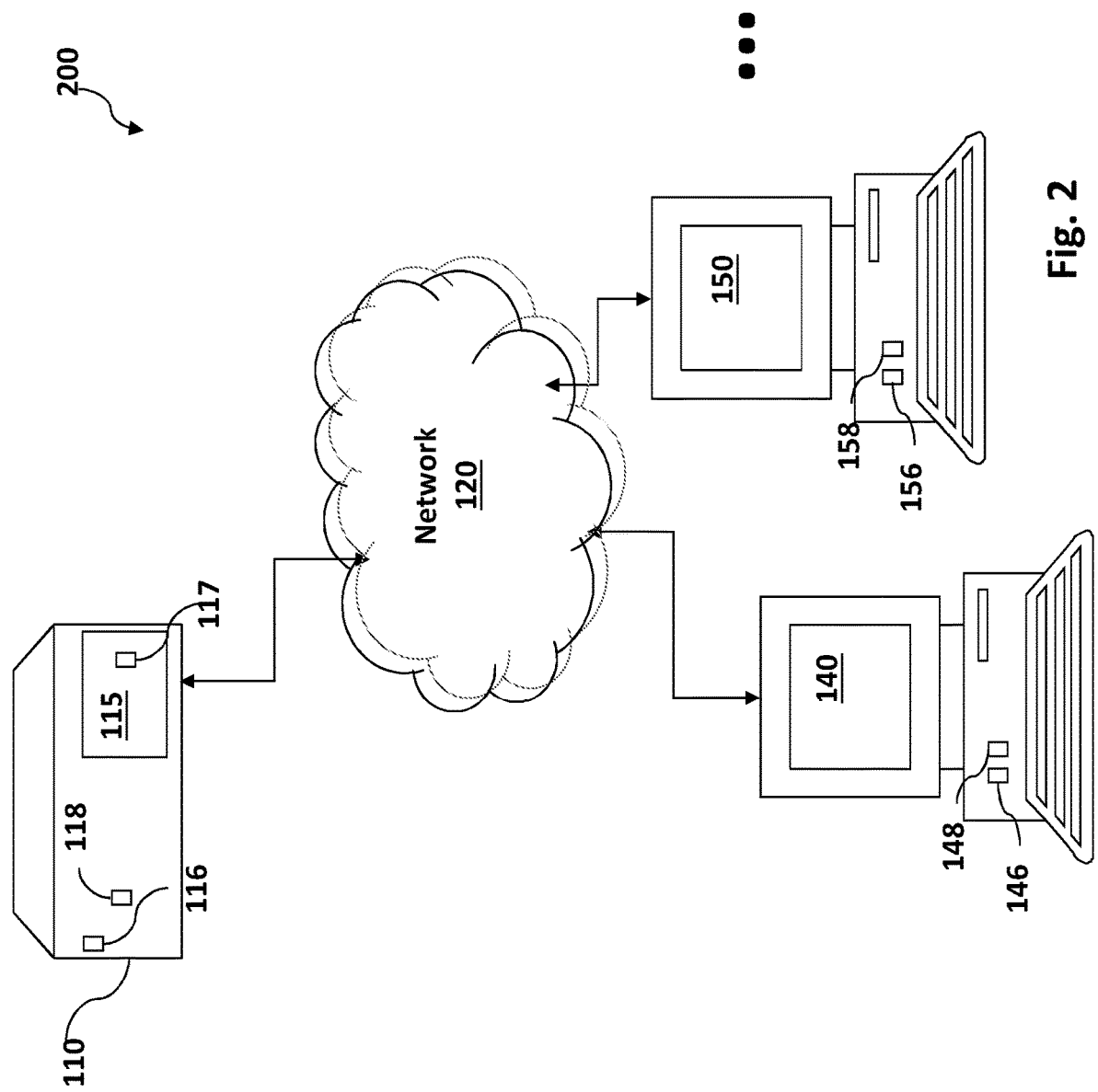
FIG. 2 is a schematic illustration of a multi-party system for token-based obfuscation of secret information, according to an embodiment of the invention.

Reference is made to FIG. 2, which schematically illustrates a multi-party system 200 for token-based obfuscation of secret information, according to an embodiment of the invention. System 200 may be used to execute embodiments disclosed herein. The devices of system 200 may be operated by one of the parties disclosed herein including, for example, a data provider, a test provider, and/or a computation host. In the example described below, one or more server(s) 110 are operated by a computation host and one or more computer(s) 140, 150, . . . are operated by respective data and test providers, although any other parties may operate these devices in accordance with other embodiments of the invention. Data provider and test provider may be the same or different entities operating the same or different devices. Data provider and test provider are typically separate entities and operate separate devices from the computational host.

System 200 may include one or more computation host server(s) 110, an associated database 115, one or more computer(s) 140, 150, . . . of one or more data and/or test providers, all of which are connected via a network 120. Data provider computer 150 may securely store unencrypted (or encrypted or) data and keys associated with the data or data provider. Test provider computer 140 may securely store unencrypted (or encrypted or) tests (e.g., computations, algorithms, functions) and keys associated with the test or test provider.

Computation host server(s) 110 may include a computing device for hosting computations or tests on data encrypted by one or more keys according to embodiments disclosed herein. Computation host server(s) 110 may include applications for interacting with data and test provider computers 140 and 150.

Database 115 may include software processes or applications for storing and retrieving data 117 such as tests, functions or computations, encrypted data from data and/or test provider computers 140 and 150 (encrypted by single or multi-party keys), and/or encryption, decryption and/or re-encryption keys. Data 117 may also include code (e.g., software code) or logic, e.g., to enable the application of tests or computations on encrypted data, single, multi-party or PRE keys, or other data according to embodiments of the invention. Database 115 may be internal or external to one or more of the computation host server(s) 110 and may be connected thereto by a local or remote and a wired or wireless connection. In alternate embodiments, data 117 may be stored in an alternate location separate from database 115, e.g., memory unit(s) 118.

Data provider and test provider computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Data provider and test provider computers 140 and 150 may each include one or more input devices, for receiving input from a user (e.g., via a pointing device, click-wheel or mouse, keys, touch screen, recorder/microphone, other input components). Data provider and test provider computers 140 and 150 may each include one or more output devices (e.g., a monitor or screen) for displaying data to a user provided by or for computation host server(s) 110.

Network 120, which connects computation host server(s) 110 and data provider and test provider computers 140 and 150, may be any public or private network such as the Internet. Access to network 120 may be through wire line, terrestrial wireless, satellite or other systems well known in the art.

Computation host server(s) 110 and data provider and test provider computers 140 and 150, may include one or more controller(s) or processor(s) 116, 146, and 156, respectively, for executing operations according to embodiments of the invention and one or more memory unit(s) 118, 148, and 158, respectively, for storing data (e.g., test computations, encryption, decryption or re-encryption keys, and encrypted, decrypted or re-encrypted data) and/or instructions (e.g., software for applying test computations or calculations, keys to encrypt, decrypt or re-encrypt data according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 3:
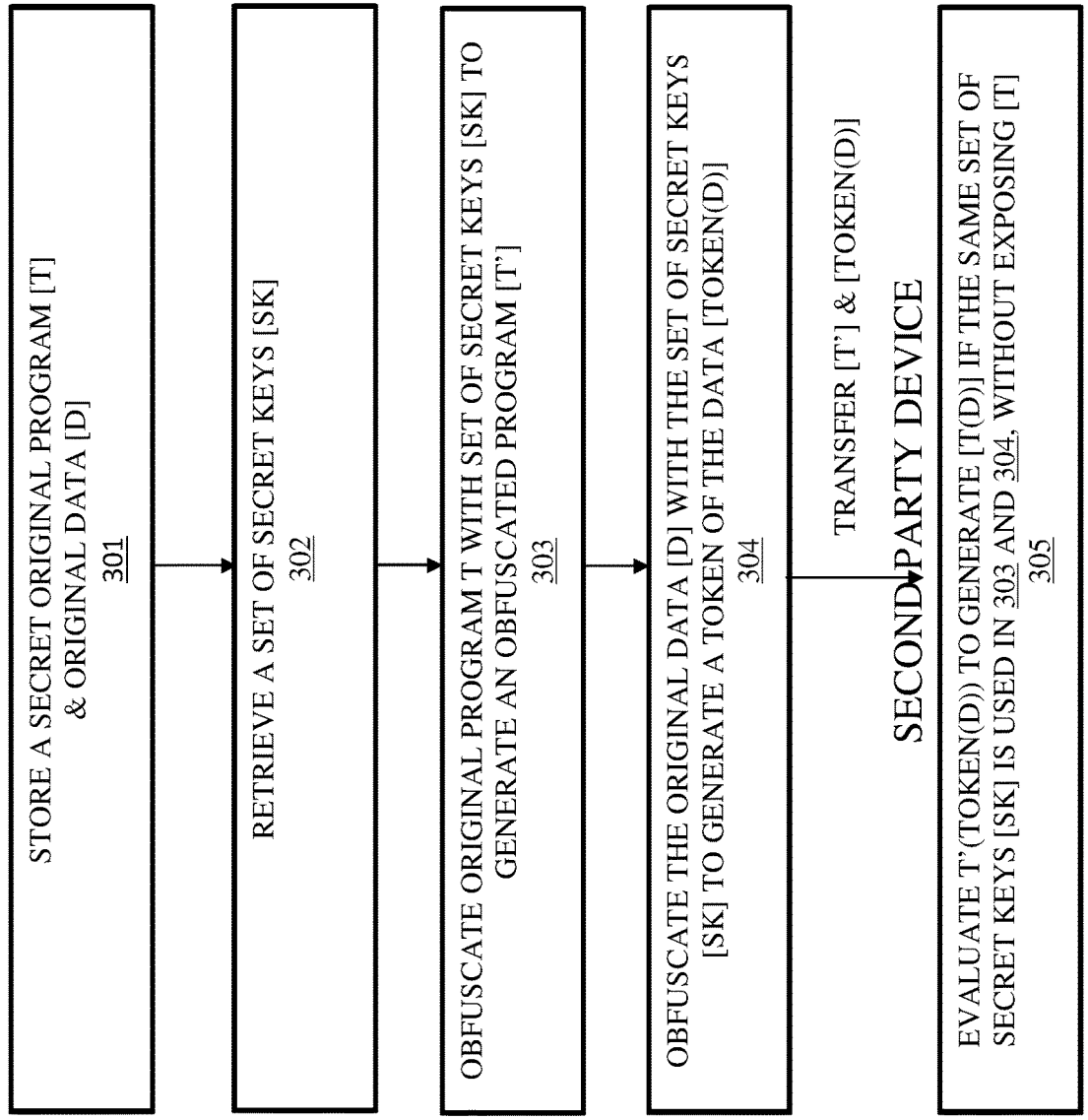
FIG. 3 is a flowchart of a method for token-based obfuscation of secret information in a multi-party system in accordance with an embodiment of the invention.

Reference is made to FIG. 3, which is a flowchart of a method for token-based obfuscation of secret information operated in a multi-party system (e.g., 100 of FIG. 1 and/or 200 of FIG. 2) in accordance with an embodiment of the invention. Operations of the method may be performed by one or more first (e.g., test provider) device(s) or part(ies) (e.g., 140 of FIG. 1), or one or more second (e.g., data provider) device(s) or part(ies) (e.g., 150 of FIG. 1), or one or more third (e.g., processing) device(s) or part(ies), or any number of N device(s) or part(ies) in the multi-party system.

In operation 301, the first party device may store in a memory (e.g., 148 of FIG. 2) a secret original program T and original data D. Original program T and original data D may be generated, stored, and/or transferred at the same or different times (e.g., as shown in FIG. 1). For example, the processor of the first party device may generate original program T at an initial stage prior to the second party device generating original data D.

In operation 302, a processor of the first party device (e.g., 146 of FIG. 2) may retrieve, obtain, or generate a set of secret keys SK. The set of secret keys SK may include a functional-encryption secret key, a functional-encryption public key, and/or a bounded-key secret-key functional-encryption (BK-SFE). For example, the set of secret keys SK may include a secret-key sk for a standard encryption, and a master secret-key msk for a functional encryption associated with a specific program T.

In operation 303, the processor of the first party device may obfuscate the original program T with the set of secret keys SK to generate an obfuscated program T'. The processor of the first party device is configured to generate the obfuscated program T' to be a program that is evaluated on input data d and executes computer code that is configured to decrypt the standard encryption of the original program using the secret-key sk to reconstruct the original program T and output the result of evaluating the original program T on the input data d, which equals T(D) if and only if d=Token (D).

In operation 304, the processor of the first party device may obfuscate the original data D with the set of secret keys SK to generate a token of the data Token(D). The processor of the first party device is configured to generate the token of the data Token(D) to be a functional encryption of the data D by the master secret key.

The first party processor may transfer, and a second party processor may receive, the obfuscated program T' and the token of the data Token(D). In some embodiments, the obfuscated program T' and the token of the data Token(D) may be generated and transferred at the same or different times (e.g., as shown in FIG. 1). For example, the processor of the first party device may generate and transfer the obfuscated program T' at an initial stage prior to, and only thereafter, as the original data D is generated or updated does the processor generate and transfer the Token(D).

In some embodiments, the processor of the first party device is configured to distribute the obfuscated program T' and the token of the data Token(D) to a plurality of second party devices to share the computational load of said evaluation, without exposing the original program T and/or the original data D to the plurality of second party devices.

In operation 305, a processor of the second party device (e.g., 156 of FIG. 2) may evaluate the obfuscated program T' on the token of the data Token(D) to generate a result equivalent to evaluating the original program T on the original data D if the same set of secret keys SK is used to obfuscate the original program T and the original data D, without exposing the original program T to the second party. The processor of the second party device is configured to evaluate the obfuscated program T' on the token of the data Token(D) to execute the computer code (G) to decrypt the original program T (encrypted by sk) and output the result of evaluating the original program on the original data T(D).

In some embodiments, the system may include an additional third party device, wherein the original program T is only exposed to first party device, the original data D is only exposed the second (and/or first) party device, and the third party device performs said evaluating to generate the result equivalent to evaluating the original program T on the original data D, without exposing either the original program T or the original data D to the third party device.

In some embodiments, the processor of the first party device is configured to generate a plurality of tokens Token $(D_i), \ldots,$ Token$(D_k)$ in operation 304 for a plurality of original data $D_1, \ldots, D_k$ in operation 301, and evaluate the obfuscated program T' on the plurality of tokens Token $(D_i), \ldots,$ Token$(D_k)$, to generate a plurality of results equivalent to evaluating the original program T on the plurality of original data $T(D_1), \ldots, T(D_k)$ in operation 305, respectively.

In some embodiments, the processor of the first party device is configured to generate a plurality of obfuscated programs $T'_1, \ldots, T'_n$ in operation 303, from a plurality of original programs $T, \ldots, T_n$ in operation 301, and evaluate the plurality of obfuscated programs $T'_1, \ldots, T'_n$ on the token of the data Token(D), to generate a plurality of results equivalent to evaluating the plurality of original programs on the original data $T_1(D), \ldots, T_n(D)$ in operation 305, respectively.

In some embodiments, the original program T comprises a linear weighted sum. In one such embodiment, the set of secret keys SK may be a set of secret numbers $y_i \in G := \mathbb{Z}^*_{N^2}$, the original program T may be defined based on a vector $(x_1, \ldots, x_n) \in G$ and the original data D may be defined based on a vector $(w_1, \ldots, w_n) \in G^n$. The processor of the first party device may be configured to generate the obfuscated program T' in operation 303 by using a number $r \in [0, 2N]$ to compute $c_0 := g^r \in G$ and for every $i \in [n]$ computing $c_i := g^{r \cdot y_i} \cdot h_{x_i} \in G$ to generate an encrypted vector $c := (c_0, c_1, \ldots, c_n)$. The processor of the first party device may be configured to generate the token of the data in operation 304 to be Token$(D) := \Sigma_{i=1}^{n} w_i y_i \in G$. The processor of the second party device may be configured to evaluate the obfuscated program T' on the token of the data Token(D) in operation 305 as:

$$c_0^{-\Sigma_{i=1}^n w_i y_i} \Pi_{i=1}^n c_i^{w_i} = g^{-r\Sigma_{i=1}^n w_i y_i} \Pi_{i=1}^n g^{rw_i y_i} h_{x_i}^{w_i} = g^{-r\Sigma_{i=1}^n w_i y_i} \cdot g^{\Sigma_{i=1}^n rw_i y_i} h^{\Sigma_{i=1}^n w_i x_i} = h^{\Sigma_{i=1}^n w_i x_i} = (N+1)^{\Sigma_{i=1}^n w_i x_i} = 1 + N \cdot \Sigma_{i=1}^n w_i x_i \in G, \text{ where } N^2 = 0 \text{ in } G,$$

which is equivalent to evaluating the original program T on the original data D as $\Sigma_{i=1}^{n} w_i x_i$.

In some embodiments, the original program T comprises one or more linear functions. In one such embodiment, the set of secret keys SK may be a set of secret vectors $s_i \in \mathbb{Z}_q^n$ for every index i, the original program T may be defined based on a vector $(x_1, \ldots, x_k)$ in $\mathbb{Z}_p^k$ (for some integer p relatively prime to q, e.g., p and q have no common factors) and the original data D may be defined based on a vector $(w_1, w_p) \in \mathbb{Z}_p^k$. The processor of the first party device may be configured to generate the obfuscated program T' by using a random vector $a \in \mathbb{Z}_p^k$ and associated values $e_i \in \mathbb{Z}_q$ to compute $c_0 := a \in \mathbb{Z}_p^k$ and for every $i \in [n]$ compute $c_i := \langle a, s_i \rangle + p e_i + x_i \in \mathbb{Z}_q$ to generate an encrypted vector $c := (c_0, c_1, \ldots, c_n)$ in operation 303. The processor of the first party device may be configured to generate the token of the data to be Token$(D) := \Sigma_{i=1}^{k} w_i s_i \in \mathbb{Z}_q^n$ in operation 304. The processor of the second party device may be configured to evaluate the obfuscated program T' on the token of the data Token(D) in operation 305 as:

$$\Sigma_{i=1}^k w_i c_i - \langle a, t \rangle = \Sigma_{i=1}^k w_i \langle a, s_i \rangle + p \cdot \Sigma_{i=1}^k w_i e_i + \Sigma_{i=1}^k w_i x_i - \langle a, \Sigma_{i=1}^k w_i s_i \rangle = p \cdot \Sigma_{i=1}^k w_i e_i + \Sigma_{i=1}^k w_i x_i,$$

where a product of p is zero in $\mathbb{Z}_q^n$, which is equivalent to evaluating the original program T on the original data D as $\Sigma_{i=1}^{k} w_i x_i$.

In some embodiments, the processors may reverse the roles of the original data D and the original program T, such that T is D and D is T.

Potential Applications

The devices, system and method for token-based obfuscation described herein may be used in various applications.

In one application, the original data D comprises one or more documents and the original program T comprises a key-work search. In one application, where the roles of the original data D and the original program T are reversed, the original program T comprises the one or more documents and the original data D comprises a key-work search.

In one application, the original data D comprises one or more images and the original program T is an image-processing program selected from the group consisting of: an image filter, an image processing program, and an object search program.

In one application, the original data D comprises sensor data and the original program T comprises a program associated with a user's security clearance.

Embodiments of the invention may also be used in fields including medical, advertising, military, and other industries.

In the medical industry, embodiments of the invention may be used to protect medical data e.g. that belongs to individuals. This data may include, for example, genetic data, patient history or procedures, medical records, etc. In some cases, data may be streamed from the data provider to the computational host on a continuous or periodic basis, reflecting the most up-to-date or real-time information for making medical decisions such as diagnosing patients or performing medical studies. Programs which execute computations or tests on this data may be based, for example, on software for personal medical calculations, predictive models for diagnosing or optimization algorithms for patient management. With FE, some computations can be performed and evaluated securely for example as follows. Individuals (e.g., operating data provider computer 150 of FIG. 2) may upload an encrypted version of their data to the cloud or a third party device (e.g., computation host server(s) 110 of FIG. 2). The data may either be encrypted by the data provider, in which case a symmetric-key FE scheme may be used, or encrypted by a third party in which case a public-key FE may be used. Individuals (e.g., operating test provider computer 140 of FIG. 2) may then provide the cloud or computational host with a token for specific functions. The cloud or computational host service may then evaluate the function by applying the token to the encrypted data. After processing, the cloud or computational host returns the output to a designated result recipient (e.g., a customer or a pre-designated third-party), e.g., according to the data provider or customer's instructions.

In the advertising industry, for example, a company may want to use contextual information to target advertising to potential customers. The customer may use a mobile or smart phone or other computing device to interact with the company, which may e.g. substantially continuously or periodically upload contextual information about the customer, including e.g. location, time of day, information from email or browsing activity such as keyword searches. Information may also be uploaded (e.g. substantially continuously or periodically) from video devices including e.g. pictures of objects of interest such as brands or faces which are automatically identified, or from a video stream from a camera attached to the customer's body which may identify contextual information in the customer's environment (e.g. objects, people, workplace vs. home vs. store). The customer may generate functions of the contextual information, for example, available to a company in exchange for monetary or other types of compensation. The company may in turn compute some function of the contextual data and determine which targeted advertisement to send back to the customer's device. In order to do this, the customer (e.g., operating data provider computer 150 of FIG. 2) may compute a token specific to the desired function and may send and store the token in the cloud or in a third party device (e.g., computation host server(s) 110 of FIG. 2). The cloud can then retrieve and execute the desired function of the data (e.g., from test provider computer 140 of FIG. 2) and pass the results on to the company. Some examples in which contextual information (and data functions therefrom) may be important for advertising or providing targeted advertisements: beer commercials during sports events, location-based advertising such as sending a user advertisements for stores when the user is detected to be near the store or scheduled or predicted to be near the store, time-targeted advertising such as cosmetics companies marketing different products at different times of day (e.g. makeup for night time vs. morning time), or a combination thereof such as advertisements or coupons for entertainment near the location and time (e.g., shows in New York near Broadway in the evening). Other contextual data may include, for example, income, profession, purchase history, travel history, address, etc.

In the video processing industry, for example, devices such as sensors mounted on drones, body cameras, audio and other recording devices, may continuously, periodically, or in real-time, capture sensitive information that is stored and later processed. This data can be encrypted and stored in a secure cloud environment (e.g. at a remote server or set of servers) to guarantee privacy. The devices that perform this processing may use a variety of machine-learning, clustering, classification, and image and voice recognition algorithms. Embodiments of the invention may provide different personnel or individuals specific tokens to compute different types of processing functions. For example, one party may be given tokens associated with a program to detect suspicious conversations over audio channels, and another party may be given tokens associated with a program to detect objects in proximity through video analysis. Upon authenticating themselves properly using their tokens, each individual or group can access ciphertexts from the cloud and apply their one or more tokens to access the output of applying the processing functions to the data. Such embodiments may serve a dual purpose: first, these embodiments ensure release of sensitive information on a need-to-know basis, where each individual or group has access to only the information it is allotted through the secure distribution of tokens. Second, these embodiments ensure that in the case of compromise of the token or unencrypted data held by one or a set of individuals or groups, no other information associated with other tokens is compromised.

In the foregoing description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the foregoing discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a non-transitory computer or processor readable medium, or a computer or processor non-transitory storage medium, such as for example a memory (e.g., memory unit(s) 118, 148, and/or 158 of FIG. 2), a disk drive, or a USB flash memory, encoding, including or storing instructions, e.g., computer-executable instructions, which, when executed by a processor or controller (e.g., processor(s) 116, 146, and 156 of FIG. 2), carry out methods disclosed herein.

It should be recognized that embodiments of the present invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for token-based obfuscation of secret information, the system comprising:
   a first party device comprising:
   a memory configured to store a secret original program T and original data D; and
   a processor configured to:
   retrieve a set of secret encryption keys SK,
   obfuscate the original program T with the set of secret encryption keys SK to generate an obfuscated program T',
   obfuscate the original data D with the set of secret encryption keys SK to generate a token of the data Token(D), and
   transfer the obfuscated program T' and the token of the data Token(D) to a second party device where the obfuscated program T' is evaluated on the token of the data Token(D) to generate a result equivalent to evaluating the original program T on the original data D if the same set of secret encryption keys SK is used to obfuscate the original program T and the original data D, without exposing the original program T to the second party.

2. The system of claim 1 comprising a third party device, wherein the original program T is only exposed to first party device, the original data D is only exposed the second party device, and the third party device performs said evaluating to generate the result equivalent to evaluating the original program T on the original data D without exposing either the original program T or the original data D to the third party device.

3. The system of claim 1, wherein the set of secret encryption keys SK comprises:
   a secret encryption key sk for a standard encryption, and
   a master secret encryption key msk for a functional encryption associated with each program.

4. The system of claim 3, wherein the processor of the first party device is configured to generate the obfuscated program T' to be a program that is to be evaluated on input data d and executes computer code that is configured to decrypt the standard encryption of the original program using the secret encryption key sk to reconstruct the original program T and output the result of evaluating the original program T on the input data d, which equals T(D) if and only if d=Token(D).

5. The system of claim 4, wherein the processor of the first party device is configured to generate the token of the data Token(D) to be a functional encryption of the data D by the master secret encryption key.

6. The system of claim 5, wherein the processor of the second party device is configured to evaluate the obfuscated program T' on the token of the data Token(D) to execute the computer code (G) to decrypt the original program T and output the result of evaluating the original program on the original data T(D).

7. The system of claim 1, wherein the set of secret encryption keys SK is a set of secret numbers $y_i \in G := \mathbb{Z}^*_{N^2}$, the original program T is defined based on a vector $(x_1, \ldots, x_n) \in G$ and the original data D is defined based on a vector $(w_1, \ldots, w_n) \in G^n$,
   wherein the processor of the first party device is configured to:
      generate the obfuscated program T' by using a number $r \in [0, 2N]$ to compute $c_0 := g^r \in G$ and for every $i \in [n]$ computing $c_i := g^{ry_i} h^{x_i} \in G$ to generate an encrypted vector $c := (c_0, c_1, \ldots, c_n)$, and
      generate the token of the data to be Token(D):=
      $\Sigma_{i=1}^n w_i y_i \in G$,
   wherein the processor of the second party device is configured to evaluate the obfuscated program T' on the token of the data Token(D) as:

$c_0^{-t} \Pi_{i=1}^n c_i^{w_i} = g^{-rt} \Pi_{i=1}^n g^{rw_i y_i} h^{w_i x_i} =$
   $g^{-r \Sigma_{i=1}^n w_i y_i} \cdot g^{\Sigma_{i=1}^n r w_i y_i} h^{\Sigma_{i=1}^n w_i x_i} = h^{\Sigma_{i=1}^n w_i x_i} =$
   $(N+1)^{\Sigma_{i=1}^n w_i x_i} = 1 + N \cdot \Sigma_{i=1}^n w_i x_i \in G$, where
   $N^2 = 0$ in $G$, which is equivalent to evaluating the original program T on the original data D as $\Sigma_{i=1}^n = 1 w_i x_i$.

8. The system of claim 1, wherein the set of secret encryption keys SK is a set of secret vectors $s_i \in Z_q^n$ for every index i, the original program T is defined based on a vector $(x_1, \ldots, x_k)$ in $Z_p^k$ (for some integer p relatively prime to q) and the original data D is defined based on a vector $(w_1, \ldots, w_n) \in Z_p^k$,
   wherein the processor of the first party device is configured to:
      generate the obfuscated program r by using a random vector $a \in Z_q^n$ and associated values $e_i \in Z_q$ to compute $c_0 := a \in Z_q^n$ and for every $i \in [n]$ compute $c_i := \langle a, s_i \rangle + p e_i + x_i \in Z_q$ to generate an encrypted vector $c := (c_0, c_1, \ldots, c_n)$, and generate the token of the data to be Token(D):=
$\Sigma_{i=1}^k w_i s_i \in Z_q^n$,
wherein the processor of the second party device is configured to evaluate the obfuscated program r on the token of the data Token(D) as:

$\Sigma_{i=1}^k w_i c_i = \Sigma_{i=1}^k w_i \langle a, s_i \rangle + p \cdot \Sigma_{i=1}^k w_i e_i +$
$\Sigma_{i=1}^k w_i x_i - \langle a, \Sigma_{i=1}^k w_i s_i \rangle = p \cdot \Sigma_{i=1}^k w_i e_i + \Sigma_{i=1}^k w_i x_i$,
where a product of p is zero in $Z_q^n$, which is equivalent to evaluating the original program T on the original data D as $\Sigma_{i=1}^k w_i x_i$.

9. The system of claim 1 wherein the processor of the first party device is configured to generate a plurality of tokens Token($D_1$), . . . , Token($D_k$) for a plurality of original data $D_1, \ldots, D_k$, and evaluate the obfuscated program T' on the plurality of tokens Token($D_1$), . . . , Token($D_k$), to generate a plurality of results equivalent to evaluating the original program T on the plurality of original data T($D_1$), . . . , T($D_k$), respectively.

10. The system of claim 1 wherein the processor of the first party device is configured to generate a plurality of obfuscated programs $T'_1, \ldots, T'_n$, from a plurality of original programs $T, \ldots, T_n$, and evaluate the plurality of obfuscated programs $T'_1, \ldots, T'_n$ on the token of the data Token(D), to generate a plurality of results equivalent to evaluating the plurality of original programs on the original data $T_1(D), \ldots, T_n(D)$, respectively.

11. The system of claim 1, wherein the processor of the first party device is configured to distribute the obfuscated program T' and the token of the data Token(D) to a plurality of second party devices to share the computational load of said evaluation, without exposing either the original program T to the plurality of second party devices.

12. A system for token-based obfuscation of secret information, the system comprising:
    a second party device comprising:
       a processor configured to:
          receive from a first party device an obfuscated program T' that is obfuscated by encoding the original program T with the set of secret encryption keys SK,
          receive from a first party device a token of the data Token(D) that is obfuscated by encoding the original data D with the set of secret encryption keys SK, and
          evaluate the obfuscated program T' on the token of the data Token(D) to generate a result equivalent to evaluating the original program T on the original data D if the same set of secret encryption keys SK is used to obfuscate the original program T and the original data D, without exposing the original program T to the second party.

13. A method for token-based obfuscation of secret information, the method performed at a first party device comprising:
    storing a secret original program T and original data D; and
    retrieving a set of secret encryption keys SK,
    obfuscating the original program T with the set of secret encryption keys SK to generate an obfuscated program T',
    obfuscating the original data D with the set of secret encryption keys SK to generate a token of the data Token(D), and
    transferring the obfuscated program T' and the token of the data Token(D) to a second party device where the obfuscated program T' is evaluated on the token of the data Token(D) to generate a result equivalent to evaluating the original program T on the original data D if the same set of secret encryption keys SK is used to obfuscate the original program T and the original data D, without exposing the original program T to the second party.

14. The method of claim 13 comprising a third party device, wherein the original program T is only exposed to first party device, the original data D is only exposed to second party device, and the third party device performs said evaluating to generate the result equivalent to evaluating the original program T on the original data D without exposing either the original program T or the original data D to the third party device.

15. The method of claim 13, wherein the set of secret encryption keys SK comprises:
   a secret encryption key sk for a standard encryption, and
   a master secret encryption key msk for a functional encryption associated with each program.

16. The method of claim 15, comprising, at the first party device, generating the obfuscated program T' to be a program that is to be evaluated on input data d and executes computer code that is configured to decrypt the standard encryption of the original program using the secret encryption key sk to reconstruct the original program T and output the result of evaluating the original program T on the input data d, which equals T(D) if and only if d=Token(D).

17. The method of claim 16, comprising, at the first party device, generating the token of the data Token(D) to be a functional encryption of the data D by the master secret encryption key.

18. The method of claim 17, wherein evaluating the obfuscated program T' on the token of the data Token(D) executes the computer code (G) to decrypt the original program T and output the result of evaluating the original program on the original data T(D).

19. The method of claim 13, wherein the set of secret encryption keys SK is a set of secret numbers $y_i \in G := \mathbb{Z}^*_{N^2}$, the original program T is defined based on a vector $(x_1, \ldots, x_n) \in G$ and the original data D is defined based on a vector $(w_1, \ldots, w_n) \in G^n$, comprising:
   at the first party device:
      generating the obfuscated program T' by using a number $r \in [0, 2N]$ and computing $c_0 := g^r \in G$ and for every $i \in [n]$ $c_i := g^{ry_i} h^{x_i} \in G$ to generate an encrypted vector $c := (c_0, c_1, \ldots, c_n)$, and
      generating the token of the data to be Token $(D) := \sum_{i=1}^{n} w_i y_i \in G$, at the second party device:

wherein the evaluating the obfuscated program T' on the token of the data Token(D) generates the result:

$$c_0^{-T} \Pi_{i=1}^{n} c_i^{w_i} = g^{-rT} \Pi_{i=1}^{n} g^{rw_i y_i} h^{w_i x_i} =$$
$$g^{-r\Sigma_{i=1}^{n} w_i y_i} \cdot g^{\Sigma_{i=1}^{n} rw_i y_i} h^{\Sigma_{i=1}^{n} w_i x_i} =$$
$$h^{\Sigma_{i=1}^{n} w_i x_i} = (N+1)^{\Sigma_{i=1}^{n} w_i x_i} = 1 + N \cdot \Sigma_{i=1}^{n} w_i x_i \in$$
$G$, where $N^2 = 0$ in $G$, which is equivalent to evaluating the original program T on the original data D as $\Sigma_{i=1}^{n} w_i x_i$.

20. The method of claim 13, wherein the set of secret encryption keys SK is a set of secret vectors $s_i \in Z_q^n$ for every index i, the original program T is defined based on a vector $(x_1, \ldots, x_k)$ in $Z_p^k$ (for some integer p relatively prime to q) and the original data D is defined based on a vector $(w_1, \ldots, w_n) \in Z_p^k$, comprising:
   at the first party device:
      generating the obfuscated program T' by using a random vector $a \in Z_q^n$ and associated values $e_i \in Z_q$ and computing $c_0 := a \in Z_q^n$ and for every $i \in [n]$ $c_i := \langle a, s_i \rangle + pe_i + x_i \in Z_q$ to generate an encrypted vector $c := (c_0, c_1, \ldots, c_n)$, and
      generating the token of the data to be Token(D): $\Sigma_{i=1}^{k} = \in Z_q^n$, at the second party device:

wherein evaluating the obfuscated program T' on the token of the data Token(D) generates the result:

$$\Sigma_{i=1}^{k} w_i c_i - \langle a, t \rangle = \Sigma_{i=1}^{k} w_i \langle a, s_i \rangle + p \cdot \Sigma_{i=1}^{k} w_i e_i +$$
$$\Sigma_{i=1}^{k} w_i x_i - \langle a, \Sigma_{i=1}^{k} w_i s_i \rangle = p \cdot \Sigma_{i=1}^{k} w_i e_i + \Sigma_{i=1}^{k} w_i x_i,$$
where a product of $p$ is zero in $Z_q^n$, which is equivalent to evaluating the original program T on the original data D as $w_i x_i$.

21. A method for token-based obfuscation of secret information, the method performed at a second party device comprising:
   receiving from a first party device an obfuscated program T' that is obfuscated by encoding the original program T with the set of secret encryption keys SK;
   receiving from a first party device a token of the data Token(D) that is obfuscated by encoding the original data D with the set of secret encryption keys SK; and
   evaluating the obfuscated program T' on the token of the data Token(D) to generate a result equivalent to evaluating the original program T on the original data D if the same set of secret encryption keys SK is used to obfuscate the original program T and the original data D, without exposing the original program T to the second party.

* * * * *